US012743737B2

(12) United States Patent
Chapman

(10) Patent No.: US 12,743,737 B2
(45) Date of Patent: Sep. 22, 2026

(54) DIGITAL (ON SCREEN) MONOCHROMATIC WATERMARK

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 308 days.

(21) Appl. No.: 18/403,689

(22) Filed: Jan. 3, 2024

(65) Prior Publication Data

US 2025/0217919 A1 Jul. 3, 2025

(51) Int. Cl.
*G06K 9/00* (2022.01)
*G06T 1/00* (2006.01)

(52) U.S. Cl.
CPC .......... *G06T 1/005* (2013.01); *G06T 2200/24* (2013.01); *G06T 2201/0062* (2013.01); *G06T 2201/0064* (2013.01)

(58) Field of Classification Search
CPC ........................ G06T 1/005; G06T 2201/0062
See application file for complete search history.

(56) References Cited

U.S. PATENT DOCUMENTS 5,734,752 A 3/1998 Knox
8,014,035 B2 9/2011 Monga et al.
8,077,907 B2 12/2011 Wang
8,199,969 B2 6/2012 Reed
9,117,268 B2 8/2015 Reed
9,781,294 B1 10/2017 Chapman
11,006,021 B1 5/2021 Ireland et al.
2008/0019559 A1 1/2008 Wang et al.
2008/0151311 A1 6/2008 Sharma et al.
2015/0063659 A1 3/2015 Poder et al.
2023/0109676 A1 4/2023 Chapman

FOREIGN PATENT DOCUMENTS

WO WO-2004051917 A1 * 6/2004 ......... H04N 1/00037
WO WO-2017089736 A1 * 6/2017 ............. G06F 18/22

OTHER PUBLICATIONS

EP Search Report, EP Application No. 25150011.2-1218, May 8, 2025.

* cited by examiner

*Primary Examiner* — Molly Wilburn
*Assistant Examiner* — Aidan Keup
(74) *Attorney, Agent, or Firm* — KPPB Law; Kermit D. Lopez; Luis M. Ortiz

(57) ABSTRACT

Methods and systems for rendering a watermark, can involve creating a digital watermark by applying grayscale inversion and contrast reduction to a document, resulting in a visually distinguishable pattern and rendering a digital watermark on the document in a manner that allows verification at different viewing angles. The digital watermark can be created using a digital swatch sheet of multiple gray values. The document can be viewed varying angles to verify the validity of the document based on the visibility and characteristics of the digital watermark. The digital watermark may be modified on predetermined parameters to facilitate enhanced security against fraud.

20 Claims, 6 Drawing Sheets

DIGITAL (ON SCREEN) MONOCHROMATIC WATERMARK

TECHNICAL FIELD

Embodiments are related to image processing methods, systems and devices. Embodiments also relate to the field of specialty imaging techniques. Embodiments further relate to the creation and rendering of specialty effects, which may be incorporated into rendered documents. Embodiments further relate to digital watermarks.

BACKGROUND

Specialty imaging techniques are a set of advanced and specialized methods used in printing applications, including the incorporation of digital watermarks. These techniques are designed to enhance the security and authenticity of printed documents, such as banknotes, passports, ID cards, and other sensitive materials, by making them difficult to counterfeit or reproduce accurately. These specialty imaging techniques can also be utilized in non-security applications such as incorporating special effects into, for example, greeting cards and advertising materials.

Specialty imaging is useful for the creation of digital watermarks, which are embedded patterns or information within a printed image that are typically imperceptible to the human eye but can be detected using specialized equipment or software. Digital watermarks (sometimes referred to simply as a 'watermark' or 'watermarks') can serve as a means of authentication and can contain information such as the document's origin, serial number, or security features.

Digital watermarks may be visible or invisible. Visible watermarks are discernible by the naked eye and may include text or patterns that are difficult to replicate accurately. Invisible watermarks are hidden within the document's content and require specialized tools for detection. Watermarks can be robust, meaning they remain detectable even after various printing and scanning processes, or fragile, meaning they are easily damaged if the document is tampered with.

Various security printing techniques, such as color-changing ink and specialty imaging watermarks such as GlossMarks™ (GL) and ultra-violet (UV) watermarks, offer robust protection against counterfeiting and fraud for valuable documents. These features, designed to exhibit a single color/pattern from one angle/spectrum and reveal a visible watermark from another, can provide an added layer of security when applied to printed media. However, it is important to note that these effects are effective in safeguarding physical copies, such as printed concert tickets, but may not extend the same level of protection to digital or on-screen representations. For instance, while traditional event tickets may solely rely on barcodes for protection, the vulnerability arises as copies, whether digital or printed, could potentially compromise the integrity of the ticketing system, allowing unauthorized access and flagging legitimate users.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the embodiments to provide for improved image-processing methods, systems, and devices.

It is another aspect of the embodiments to provide for improved methods and systems for rendering an improved watermark for use in printing applications including security and non-security type applications.

It is a further aspect of the embodiments to provide for methods and systems for creating and rendering an improved digital watermark.

It is also an aspect of the embodiments to provide for methods and system for creating and rendering a digital (on screen) monochromatic watermark.

The aforementioned aspects and other objectives and advantages can now be achieved as described herein. In an embodiment, a method for rendering a watermark, can involve: creating a digital watermark by applying grayscale inversion and contrast reduction to a document, resulting in a visually distinguishable pattern; and rendering a digital watermark on the document in a manner that allows verification at different viewing angles.

An embodiment can further involve creating a digital watermark by applying grayscale inversion and contrast reduction to a document, further comprises: creating a digital swatch sheet of multiple gray values.

An embodiment can also involve viewing the document at varying angles to verify a validity of the document based on the visibility and characteristics of the digital watermark.

An embodiment can further involve modifying the digital watermark based on predetermined parameters to facilitate enhanced security against fraud.

In an embodiment, the step or operation of rendering the digital watermark on the document in a manner that allows verification at different viewing angles, can further involve rendering the digital watermark in a low-cost monochrome application.

In an embodiment, a method for rendering a digital watermark, can involve: in a first viewing mode, viewing a digital swatch sheet on a screen and verifying that a predefined text is darker than a background, wherein the digital swatch sheet is initially configured with multiple gray values; in a second viewing mode, viewing the digital swatch sheet on the screen and verifying that a second predefined text is lighter than the background; at a second angle, verifying that the inverse of the first and second viewing modes is true; and at a third angle, verifying that the digital watermark virtually disappears with respect to at least two gray swatches on the digital swatch sheet, wherein the at least two gray swatches are based on the multiple gray values.

An embodiment can further involve adding at least one working patch to a digital document based on the verified digital watermark.

In an embodiment, the verified digital watermark can be a monochromatic watermark.

In an embodiment, in the first viewing mode, viewing the digital swatch sheet on the screen and verifying that the predefined text is darker than the background, can further involve verifying that the predefined text is darker than the background in one part of the digital watermark.

In an embodiment, in the second viewing mode, viewing the digital swatch sheet on the screen and verifying that the second predefined text is lighter than the background, can further involve verifying that the second predefined text is lighter than the background in another part of the digital watermark.

An embodiment can further involve generating the digital swatch sheet with multiple gray values by arranging in a predefined layout digital representations of a plurality of gray values among the multiple gray values.

An embodiment can further involve providing a user interface for customizing an arrangement and an organization of the digital representations within the digital swatch sheet.

In an embodiment, a system for rendering a digital watermark, can include at least one processor and a memory, the memory storing instructions to cause the at least one processor to perform: in a first viewing mode, viewing a digital swatch sheet on a screen and verifying that a predefined text is darker than a background, wherein the digital swatch sheet is initially configured with multiple gray values; in a second viewing mode, viewing the digital swatch sheet on the screen and verifying that a second predefined text is lighter than the background; at a second angle, verifying that the inverse of the first and second viewing modes is true; and at a third angle, verifying that the digital watermark virtually disappears with respect to at least two gray swatches on the digital swatch sheet, wherein the at least two gray swatches are based on the multiple gray values.

In an embodiment of the system, the instructions can further cause the at least one processor to perform: adding at least one working patch to a digital document based on the verified digital watermark.

In an embodiment of the system, the verified digital watermark can comprise a monochromatic watermark.

In an embodiment, the instructions can further cause the at least one processor to perform adding at least one working patch to a digital document based on the verified digital watermark, wherein the verified digital watermark comprises a monochromatic watermark.

In an embodiment, in the first viewing mode, viewing the digital swatch sheet on the screen and verifying that the predefined text is darker than the background, can further involve: verifying that the verifying that the predefined text is darker than the background in one part of the digital watermark.

In an embodiment, in the second viewing mode, viewing the digital swatch sheet on the screen and verifying that the second predefined text is lighter than the background, can further involve: verifying that the second predefined text is lighter than the background in another part of the digital watermark.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Figure 1:
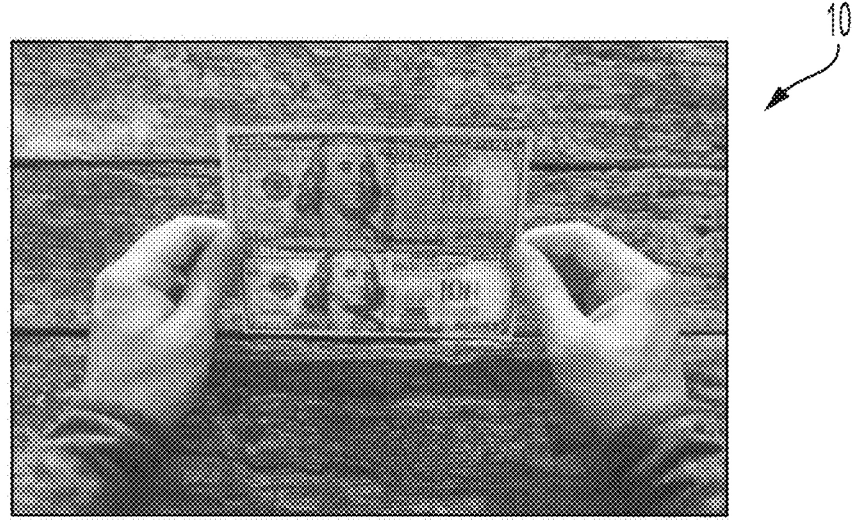
FIG. 1 illustrates an image of real currency above fake currency with the fake currency missing a watermark on the right side.

It is important to note that while the drawings and figures presented herein are illustrated in black and white, they might have originally been created and displayed in color. As a result, those skilled in the art will understand that even though the images and figures may not display color, they may actually depict features in color.

DETAILED DESCRIPTION

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein do not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. Furthermore, the term "at least one" as utilized herein can refer to "one or more". For example, "at least one widget" may refer to "one or more widgets."

The term "data" refers herein to physical signals that indicate or include information. An "image," as a pattern of physical light or a collection of data representing the physical light, may include characters, words, and text as well as other features such as graphics.

A "digital image" is by extension an image represented by a collection of digital data. An image may be divided into "segments," each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel," which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. An operation can perform "image processing" when it operates on an item of data that relates to part of an image.

The term "metameric" as utilized herein can relate to a metameric pair of pattern ink. In a metameric pair of pattern ink (also referred to simply as a "metameric pair") the printing and paper are not visually distinguishable when viewed from one angle but are from another angle (relative to a light source) which can create a watermark without more expensive spot inks, toners, and/or printers.

The term L*a*b (also referred to as Lab or LAB) as utilized herein relates to the CIELAB color space (L*a*b), which is a color space defined by the International Commission on Illumination (CIE). L*a*b It expresses color as three values: L*for perceptual lightness and a*and b*for the four unique colors of human vision: red, green, blue and yellow. CIELAB was intended as a perceptually uniform space, where a given numerical change corresponds to a similar perceived change in color. While the LAB space is not truly perceptually uniform, it nevertheless is useful in industry for detecting small differences in color.

The term CMYK as utilized herein relates to the CMYI color model, wherein CYMK refers to the four ink plates used: cyan, magenta, yellow, and key (black). The CMYK model works by partially or entirely masking colors on a lighter, usually white, background. The ink reduces the light that would otherwise be reflected. Such a model is considered subtractive because inks "subtract" the colors red, green and blue from white light. White light minus red leaves cyan, white light minus green leaves magenta, and white light minus blue leaves yellow. An example of an additive color model is the RGB color model in which the red, green, and blue primary colors of light are added together to reproduce a broad array of colors. "RGB" relates to the three primary colors, red, green and blue. RGB (i.e., the RGB color model) can be used for sensing, representation, and display of images in electronic systems, such as televisions and computers.

The term "watermark" as utilized herein can relate to a piece of a transparent text, image, logo or other markings that can be applied to media (e.g., a document, paper, a photo, an image, etc.), which can make it more difficult to copy or counterfeit the media (to which the watermark is applied through security printing) or use it without permission. A "watermark" can be a special-purpose text or picture that can be printed across one or more pages. For example, one can add a word like Copy, Draft, or Confidential as a watermark instead of stamping it on a document before distribution.

FIG. 1 illustrates an image 10 of real currency positioned above fake currency with the fake currency missing a watermark on the right side. The image 10 shown in FIG. 1 depicts a real bill (top) and fake bill (bottom) missing the watermark on the right side. In FIG. 1, the image 10 provides a visual representation of the authentic currency note juxtaposed above the counterfeit counterpart. Image 10 serves to illustrate a comparative analysis between a genuine banknote positioned at the top and a spurious bill situated at the bottom. Thus, a key distinguishing factor between the two lies in the absence of a watermark on the right side of the forged currency.

Figure 2:
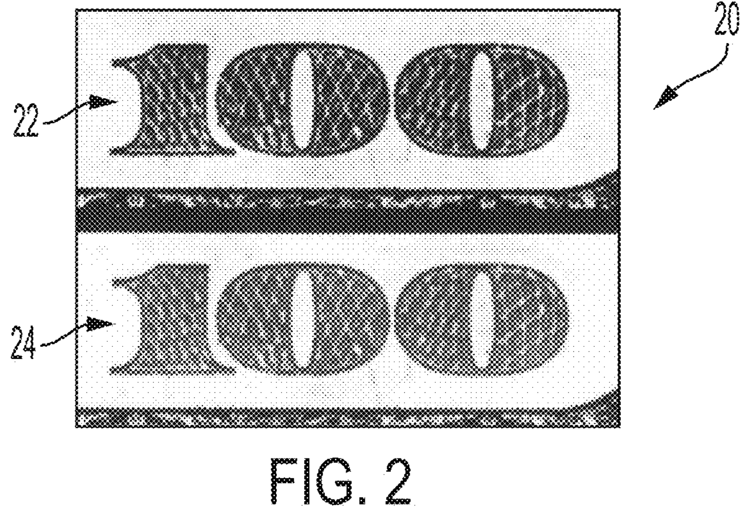
FIG. 2 illustrates an image demonstrating color shift.

FIG. 2 illustrates an image 20 demonstrating color shift. Text 22 shown as "100" in FIG. 2 is positioned above text 24 also shown as "100" in the image 20. This image depicts the effect of shift ink made from special (expensive) inks that appear as two different colors at two angles. The image 20 highlights the distinctive attribute of shift ink—a unique formulation comprising special, and often more expensive, inks that exhibit a dual-color appearance when viewed from different angles.

The juxtaposition of the two instances of the text/numeral "100" in the image serves to emphasize the color-shifting characteristic of the ink. At one angle, the text 22 and 24 may appear as one specific color, and upon a change in viewing angle, the color seamlessly transforms into another hue. This effect is a direct result of the specialized properties of the shift ink, demonstrating its ability to manifest two distinct colors, adding an additional layer of complexity and security to the printed material.

Figure 3:
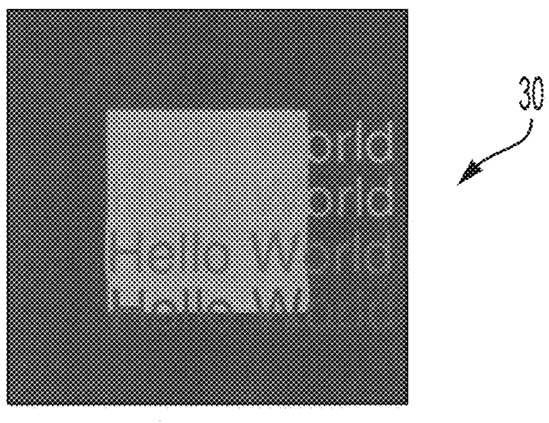
FIG. 3 illustrates an image of a digital swatch sheet.

FIG. 3 illustrates an image 30 of an example digital swatch sheet, which includes the text "HELLO WORLD". The digital swatch sheet shown in FIG. 3 can service as a visual reference guide that can demonstrates a range of colors achievable through digital rendering. Note that the term "digital swatch sheet" as utilized herein can relate to a digitally generated document or image that can systematically display a collection of color samples. These samples can provide a diverse palette of colors that can be produced by a digital printing system. Each color swatch within the sheet can serve as a reference point, allowing designers, printers, and others to accurately assess and select specific colors for an intended application.

Figure 4:
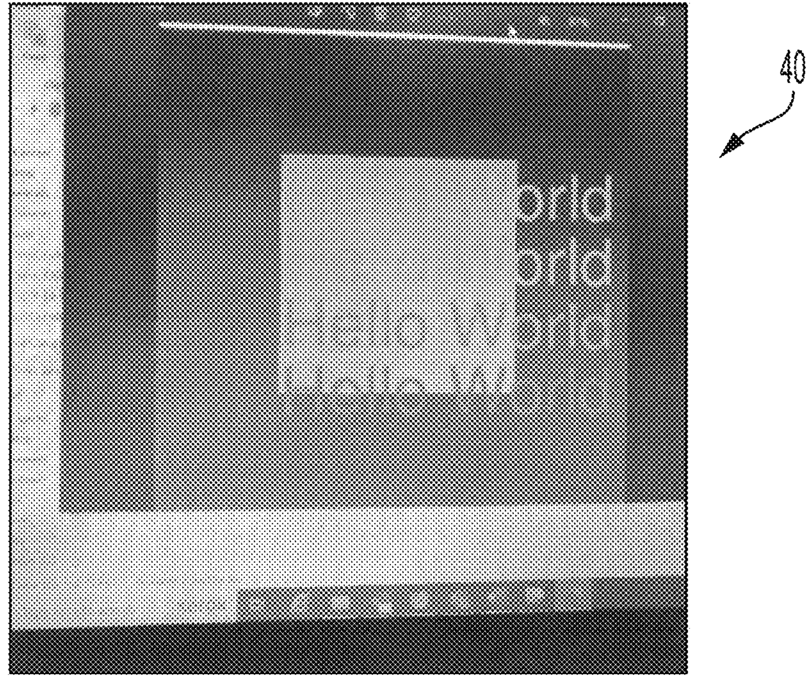
FIG. 4 illustrates an image of an on screen watermark.
Figure 5:
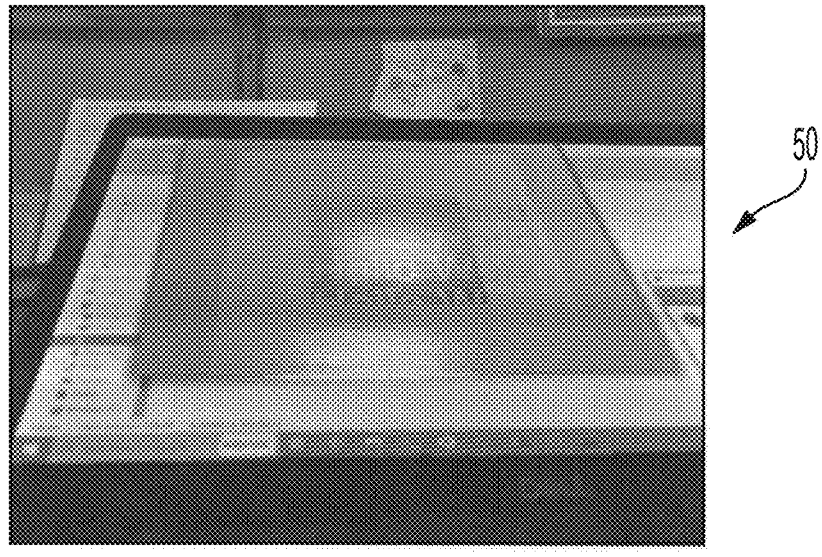
FIG. 5 illustrates an image of an on screen watermark at a second angle.
Figure 6:
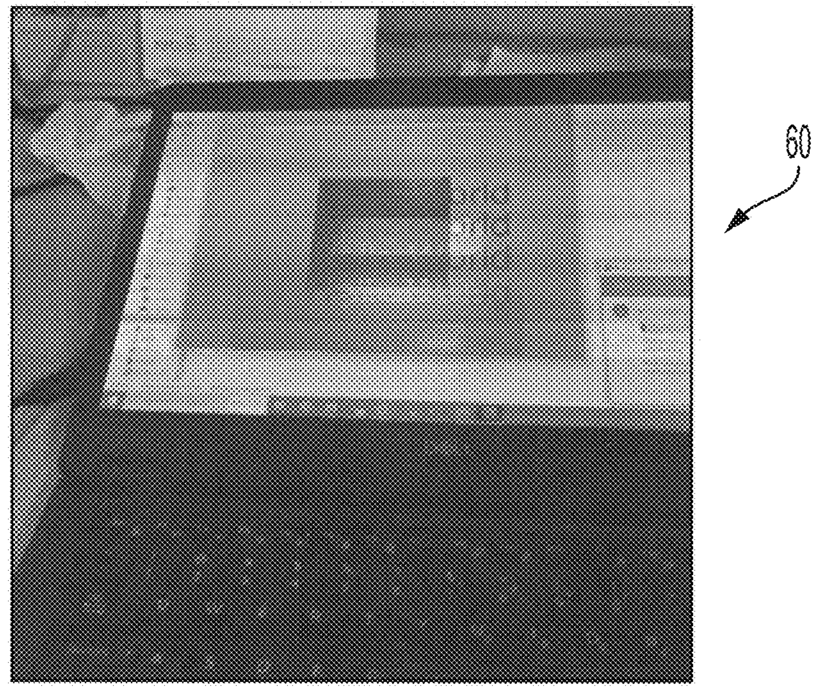
FIG. 6 illustrates an image of an on screen watermark at a third angle.

FIG. 4 illustrates an image 40 of an on-screen watermark which includes the text "HELLO WORLD". FIG. 5 illustrates an image 50 of an on screen watermark at a second angle. FIG. 6 illustrates an image 60 of an on-screen watermark at a third angle. It can be appreciated that such on-screen watermarks may be displayed on a display screen of a computing device such as, for example, the computer 250 shown in FIG. 8.

The following methodology can be implemented in accordance with an embodiment:

1) Create a digital swatch sheet of multiple gray values (e.g. see FIG. 3);
2) View on screen and verify the text "Hello W" is darker than the background (e.g., see FIG. 4);
3) View on screen and verify the text "orld" is lighter than the background (e.g., see FIG. 4);
4) At a second angle verify the inverse of steps 2 and 3 is now true (e.g., see FIG. 5);
5) At a third angle verify watermark virtually disappears for the top two swatches (e.g., see FIG. 6); and
6) Add working patch(s) to digital document(s).

Figure 7:
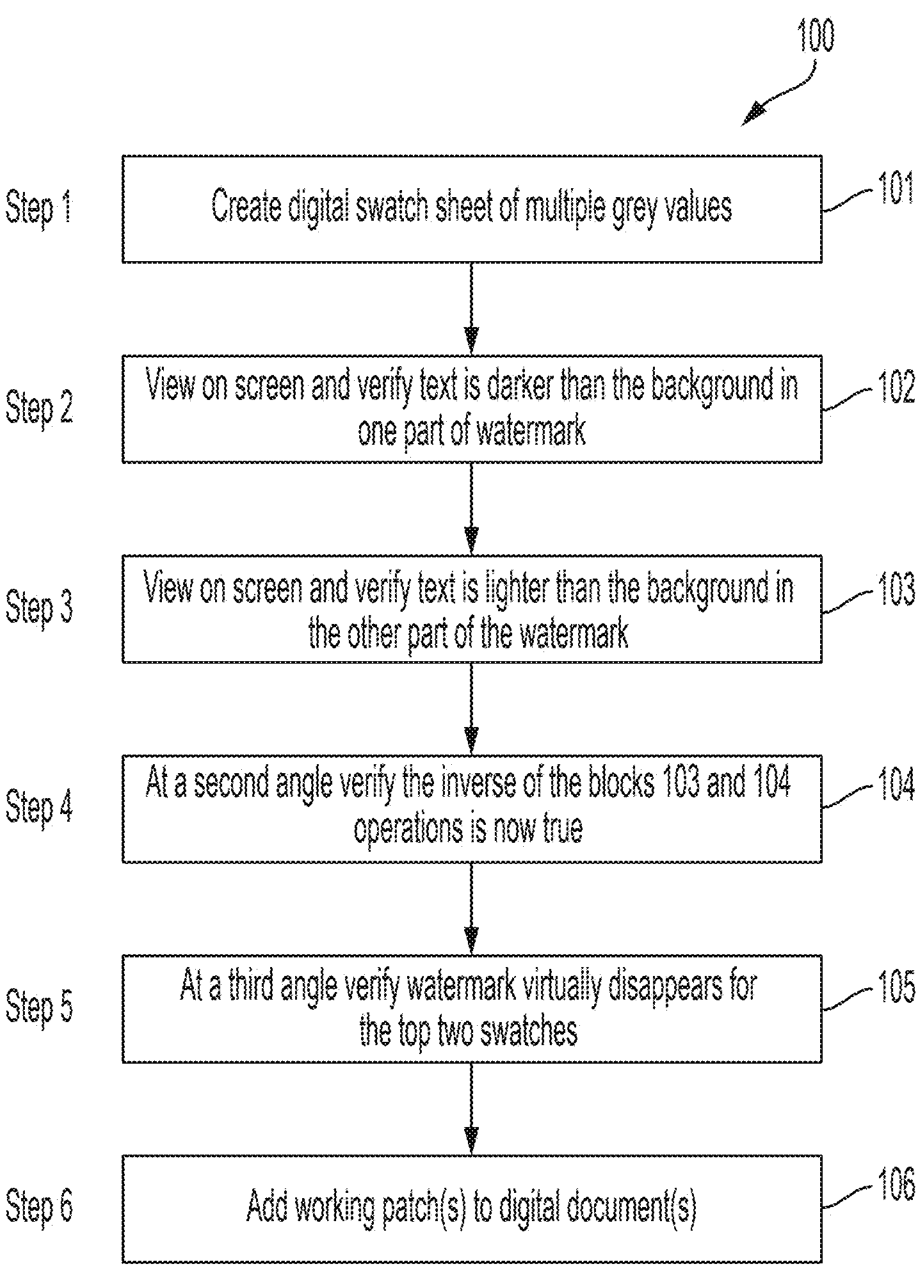
FIG. 7 illustrates a high-level flow chart of operations depicting a method for implementing an a digital (on screen) monochromatic watermark, in accordance with an embodiment.

FIG. 7 illustrates a high-level flow chart of operations depicting a method 100 for implementing an a digital (on screen) monochromatic watermark, in accordance with an embodiment. As shown at block 101, a step or operation can be implemented involving creating a digital swatch sheet of multiple gray values (e.g. see FIG. 3). Thereafter, as shown at block 102, a step or operation can be implemented involving viewing on screen and verifying that the text (e.g., "Hello W") is darker than the background (e.g., see FIG. 4) in one part of the watermark.

Next, as depicted at block 103, a step or operation can be implemented involving viewing on screen and verifying that the text (e.g., "orld") is lighter than the background (e.g., see FIG. 4) in the other part of the watermark. Thereafter, as shown at block 104, a step or operation can be implemented involving at a second angle, verifying that the inverse of the operations shown at blocks 103 and 104 is now true (e.g., see FIG. 5). Next, as shown at block 105, a step or operation can be implemented involving at a third angle, verifying that the watermark virtually disappears for the top two swatches (e.g., see FIG. 6). Finally, as shown at block 106, a step or operation can be implemented to adding a working patch(s) to the digital document(s).

It can be appreciated that an advantage of the disclosed approach is that it can work well in low-cost monochrome applications. That is, the disclosed methods relate to techniques for assessing and optimizing grayscale representation for use in, for example, printing or displaying monochrome content.

This approach involves the creation of a digital swatch sheet with multiple gray values. This process can be accomplished digitally, eliminating the need for physical swatch sheets or expensive color calibration tools. This is particularly advantageous in low-cost applications where sophisticated color calibration equipment may not be feasible. In addition, the disclosed approach also focuses on visual verification of text legibility by comparing the darkness of the text against the background. This is a practical and straightforward method that does not require specialized equipment, making it suitable for low-cost applications.

Furthermore, by verifying the text at different viewing angles, the method takes into account how the display or printed material appears from various perspectives. This is important in scenarios where the user or viewer may not always be looking at the content straight on. This consideration may be particularly relevant in cost-effective display technologies that may have limited viewing angles. Note that in some embodiments, the monochromatic watermark may remain unaffected by the type of screen used. In other words, the watermark can be generated and displayed as a digital watermark in accordance with the methodology disclosed, regardless of the specific type of screen (display screen).

The use of a digital swatch sheet and the addition of working patches to digital documents can streamline the process and make it more efficient. This may be especially advantageous in low-cost scenarios where manual processes or expensive printing equipment may be impractical. In addition, the disclosed approach can allow for adjustments based on a visual assessment, which can provide flexibility in optimizing the grayscale representation. This adaptability can be valuable in situations where the printing or display conditions may not be ideal or consistent.

The disclosed approach can leverage visual verification and angle-dependent assessments to optimize grayscale representation in a cost-effective manner. It prioritizes practicality and simplicity, making it well-suited for low-cost monochrome applications where sophisticated tools and equipment may not be readily available.

Figure 8:
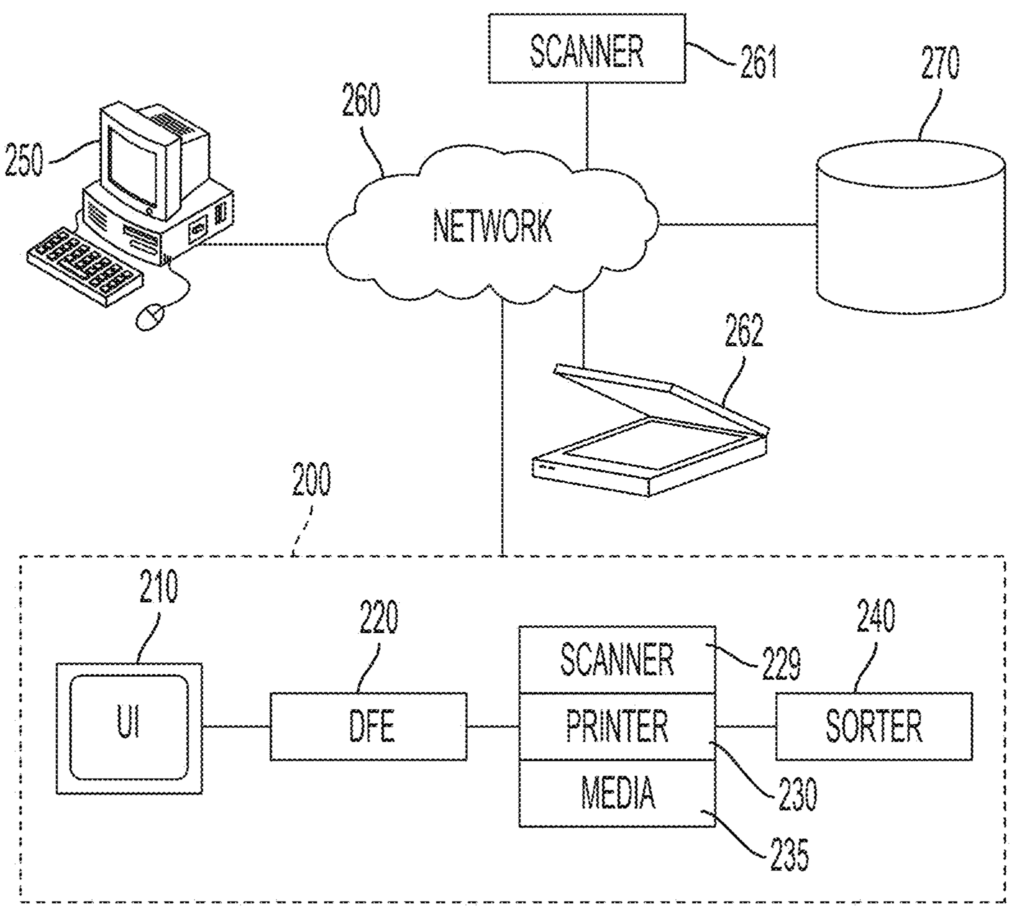
FIG. 8 illustrates a block diagram of a printing system suitable for implementing one or more of the disclosed embodiments.
Figure 9:
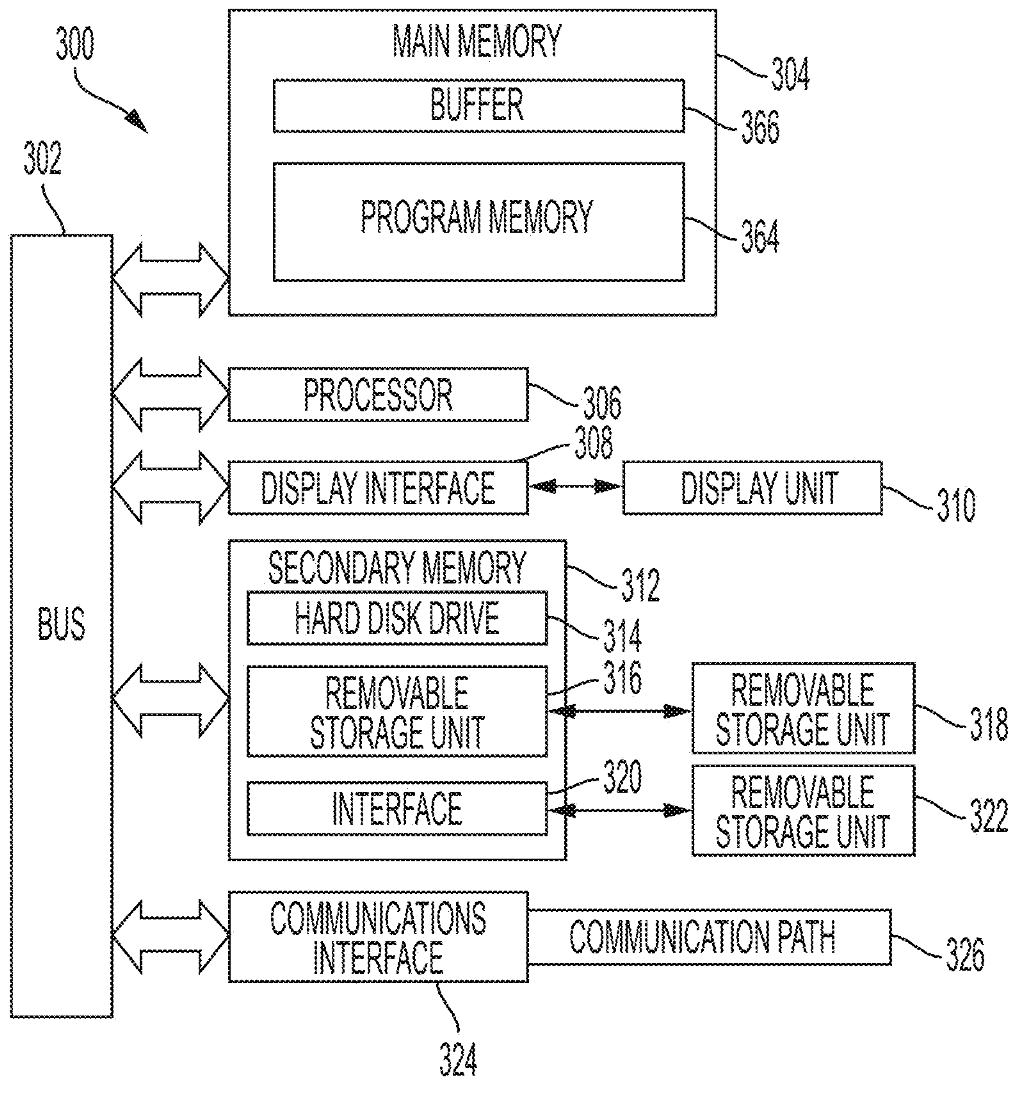
FIG. 9 illustrates a block diagram of a digital front-end controller useful for implementing one or more of the disclosed embodiments.

FIG. 8 illustrates a block diagram of a printing system 200 suitable for implementing one or more of the disclosed embodiments. FIG. 9 illustrates a block diagram of a digital front-end controller 300 useful for implementing one or more of the disclosed embodiments. For example, the printing system 200 and/or the digital front-end controller 300 can be used to render a document with a yellow, black gloss effect.

With reference to FIG. 8, a printing system (or image rendering system) 200 suitable for implementing various aspects of the exemplary embodiments described herein is illustrated. The printing system 200 can implement rendering operations such as scanning a document via a scanner and printing a document via a printer, wherein the document exhibits the disclosed yellow, black gloss effect.

Note that the term 'scanner' as utilized herein may refer to an image scanner, which is a device or system that can optically scan images, printed text, handwriting or an object and converts it to a digital image. An example of a scanner is a flatbed scanner where the document to be imaged (e.g., a form) can be placed on a glass window for scanning. The scanner may in some cases be incorporated into a multi-function device (MFD), which also may possess printing and photocopying features. The scanner may also be incorporated into, for example, a printing system such as the printing system 200 shown in FIG. 8. For example, the scanner 229 is shown in FIG. 8 as a part of the printing system 200. Alternatively, or in addition to the scanner 229 included as a part of the printing system 100, a scanner may be implemented as a separate scanner 262 also depicted in FIG. 8, which can communicate with the network 260.

The word "printer" and the term "printing system" as used herein can encompass any apparatus and/or system; such as a digital copier, xerographic and reprographic printing systems, bookmaking machine, facsimile machine, multi-function machine, ink-jet machine, continuous feed, sheet-fed printing device, etc.; which may contain a print controller and a print engine and which may perform a print outputting function for any purpose.

The printing system 200 can include a user interface 210, a digital front-end (DFE) controller 220, and at least one print engine 230. The print engine 230 has access to print media 235 of various sizes and cost for a print job. The printing system 200 can comprise a color printer having multiple color marking materials.

A "print job" or "document" is normally a set of related sheets, usually one or more collated copy sets copied from a set of original print job sheets or electronic document page images, from a particular user, or otherwise related. For submission of a regular print job (or customer job), digital data can be sent to the printing system 200.

A sorter 240 can operate after a job is printed by the print engine 230 to manage arrangement of the hard copy output, including cutting functions. A user can access and operate the printing system 200 using the user interface 210 or via a data-processing system such as a computer 250. The computer 250 can communicate bidirectionally with the printing system 200 via a communications network 260. As shown in FIG. 8, the computer 250 includes a screen (display screen) upon which a digital image may be displayed and viewed by a user.

A user profile, a work product for printing, a media library, and various print job parameters can be stored in a database or memory 270 accessible by the computer 250 or the printing system 200 via the network 260, or such data can be directly accessed via the printing system 200. One or more color sensors (not shown) may be embedded in the printer paper path, as known in the art.

With respect to FIG. 9, an exemplary DFE (Digital Front End) controller 300 is shown in greater detail. The DFE controller 300 can include one or more processors, such as processor 306, which is capable of executing machine executable program instructions. The processor 306 can function as a DFE processor.

In the embodiment shown in FIG. 9, the processor 306 can be in communication with a bus 302 (e.g., a backplane interface bus, cross-over bar, or data network). The digital front end 300 can also include a main memory 304 that is used to store machine readable instructions. The main memory 304 is also capable of storing data. The main memory 304 may alternatively include random access memory (RAM) to support reprogramming and flexible data storage. A buffer 366 can be used to temporarily store data for access by the processor 306.

Program memory 364 can include, for example, executable programs that can implement the embodiments described herein. The program memory 364 can store at least a subset of the data contained in the buffer. The digital front end 300 can include a display interface 308 that can forward data from a communication bus 302 (or from a frame buffer not shown) to a display 310. The digital front end 300 can also include a secondary memory 312 that can include, for example, a hard disk drive 314 and/or a removable storage drive 316, which can read and write to removable storage 318, such as a floppy disk, magnetic tape, optical disk, etc., that stores computer software and/or data.

The secondary memory 312 alternatively may include other similar mechanisms for allowing computer programs or other instructions to be loaded into the computer system. Such mechanisms can include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable units and interfaces, which allow software and data to be transferred.

The digital front end (DFE) controller 300 shown in FIG. 9 can include a communications interface 324, which can act as an input and an output to allow software and data to be transferred between the digital front end controller 300 and external devices. Examples of a communications interface include a modem, a network interface (such as an Ethernet card), a communications port, a PCMCIA slot and card, etc.

Computer programs (also called computer control logic) and including one or more modules may be stored in the main memory 304 and/or the secondary memory 312. Computer programs or modules may also be received via a communications interface 324. Such computer programs or modules, when executed, enable the computer system to perform the features and capabilities provided herein. Software and data transferred via the communications interface can be in the form of signals which may be, for example, electronic, electromagnetic, optical, or other signals capable of being received by a communications interface.

These signals can be provided to a communications interface via a communications path (i.e., channel), which carries signals and may be implemented using wire, cable, and fiber optic, phone line, cellular link, RF, or other communications channels. Part of the data stored in secondary memory 312 for access during a DFE operation may be a set of translation tables that can convert an incoming color signal into a physical machine signal.

This color signal can be expressed either as a colorimetric value; usually three components as L*a*b*, RGB, XYZ, etc.; into physical exposure signals for the four toners cyan, magenta, yellow and black. These tables can be created outside of the DFE and downloaded but may be optionally created inside the DFE in a so-called characterization step. Part of the data stored in secondary memory 312 may also be the previously discussed transformation table.

Several aspects of data-processing systems will now be presented with reference to various systems and methods. These systems and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A mobile "app" is an example of such software.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

The disclosed example embodiments are described at least in part herein with reference to flowchart illustrations and/or block diagrams and/or schematic diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks.

To be clear, the disclosed embodiments can be implemented in the context of, for example a special-purpose computer or a general-purpose computer, or other programmable data processing apparatus or system. For example, in some example embodiments, a data processing apparatus or system can be implemented as a combination of a special-purpose computer and a general-purpose computer. The computer program product may include a computer readable storage medium (or media) having computer readable program instructions thereon for causing a processor to carry out aspects of the embodiments.

The aforementioned computer program instructions may also be stored in a computer-readable memory that can direct a computer or other programmable data processing apparatus to function in a particular manner, such that the instructions (e.g., steps/operations) stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flow charts and block diagrams in the figures illustrate the architecture, functionality, and operation of possible implementations of systems, methods, and computer program products according to various embodiments (e.g., preferred or alternative embodiments). In this regard, each block in the flow chart or block diagrams depicted and described herein can represent a module, segment, or portion of instructions, which can comprise one or more executable instructions for implementing the specified logical function(s).

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The functionalities described herein may be implemented entirely and non-abstractly as physical hardware, entirely as physical non-abstract software (including firmware, resident software, micro-code, etc.) or combining non-abstract software and hardware implementations that may be referred to herein as a "circuit," "module," "engine", "component," "block", "database", "agent" or "system." Furthermore, aspects of the present disclosure may take the form of a computer program product embodied in one or more non-ephemeral computer readable media having computer readable and/or executable program code embodied thereon.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" (also referred to as an "engine") may constitute a software application but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines, and an implementation, which may be typically private (accessible only to that module) and which includes source code that actually implements the routines in the module. The term module may also simply refer to an application, such as a computer program designed to assist in the performance of a specific task, such as word processing, accounting, inventory management, etc.

In some example embodiments, the term "module" can also refer to a modular hardware component or a component that is a combination of hardware and software. It should be appreciated that implementation and processing of such modules according to the approach described herein can lead to improvements in processing speed and in energy savings and efficiencies in a data-processing system such as, for example, the printing system 200 shown in FIG. 8 and/or the DFE controller 300 shown in FIG. 9. A "module" can perform the various steps, operations or instructions discussed herein, such as one or more of the steps or operations discussed herein.

The methods described herein, for example, may be implemented, in part, in a computer program product comprising a module that may be executed by, for example, DFE controller 220. The computer program product may comprise a non-transitory computer-readable recording medium on which a control program can be recorded (e.g., stored), such as a disk, hard drive, or the like. Note that the term 'recording medium' as utilized herein can relate to such a non-transitory computer-readable recording medium.

Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the DFE controller 220 (for example, an internal hard drive of RAM), or may be separate (for example, an external hard drive operatively connected with the printer), or may be separate and accessed via a digital data network such as a local area network (LAN) or the Internet (e.g., as a redundant array of inexpensive or independent disks (RAID) or other network server storage that can be indirectly accessed by the DFE controller 220, via a digital network such as the network 260 shown in FIG. 8).

It is understood that the specific order or hierarchy of steps, operations, or instructions in the processes or methods disclosed is an illustration of exemplary approaches. For example, the various steps, operations or instructions discussed herein can be performed in a different order. Similarly, the various steps and operations of the disclosed example pseudo-code discussed herein can be varied and processed in a different order. Based upon design preferences, it is understood that the specific order or hierarchy of such steps, operation or instructions in the processes or methods discussed and illustrated herein may be rearranged. The accompanying claims, for example, present elements of the various steps, operations or instructions in a sample order, and are not meant to be limited to the specific order or hierarchy presented.

The inventors have realized a non-abstract technical solution to the technical problem to improve a computer-technology by improving efficiencies in such computer technology. The disclosed embodiments offer technical improvements to a computer-technology such as a data-processing system, and further provide for a non-abstract improvement to a computer technology via a technical solution to the technical problem(s) identified in the background section of this disclosure. Such improvements can result from implementations of the embodiments. The claimed solution may be rooted in computer technology in order to overcome a problem specifically arising in the realm of computers, computer networks, and printing and scanning. The claimed solution may also involve non-abstract devices such as security devices including non-abstract features such as printed media (e.g., paper) upon which the security device (e.g., a watermark) may be rendered.

Based on the foregoing, it can be appreciated that a number of different embodiments are disclosed herein. For example, in an embodiment, a method for rendering a watermark, can involve: creating a digital watermark by applying grayscale inversion and contrast reduction to a document, resulting in a visually distinguishable pattern; and rendering a digital watermark on the document in a manner that allows verification at different viewing angles.

An embodiment can also involve creating a digital watermark by applying grayscale inversion and contrast reduction to a document, further comprises: creating a digital swatch sheet of multiple gray values.

An embodiment can further involve viewing the document at varying angles to verify a validity of the document based on the visibility and characteristics of the digital watermark.

An embodiment can also involve modifying the digital watermark based on predetermined parameters to facilitate enhanced security against fraud.

In an embodiment, the step or operation of rendering the digital watermark on the document in a manner that allows verification at different viewing angles, can further involve rendering the digital watermark in a low-cost monochrome application.

In an embodiment, a method for rendering a digital watermark, can involve: in a first viewing mode, viewing a digital swatch sheet on a screen and verifying that a predefined text is darker than a background, wherein the digital swatch sheet is initially configured with multiple gray values; in a second viewing mode, viewing the digital swatch sheet on the screen and verifying that a second predefined text is lighter than the background; at a second angle, verifying that the inverse of the first and second viewing modes is true; and at a third angle, verifying that the digital watermark virtually disappears with respect to at least two gray swatches on the digital swatch sheet, wherein the at least two gray swatches are based on the multiple gray values.

An embodiment can also involve adding at least one working patch to a digital document based on the verified digital watermark.

In an embodiment, the verified digital watermark can be a monochromatic watermark.

In an embodiment, in the first viewing mode, viewing the digital swatch sheet on the screen and verifying that the predefined text is darker than the background, can further involve verifying that the predefined text is darker than the background in one part of the digital watermark.

In an embodiment, in the second viewing mode, viewing the digital swatch sheet on the screen and verifying that the second predefined text is lighter than the background, can further involve verifying that the second predefined text is lighter than the background in another part of the digital watermark.

An embodiment can further involve generating the digital swatch sheet with multiple gray values by arranging in a predefined layout digital representations of a plurality of gray values among the multiple gray values.

An embodiment can further involve providing a user interface for customizing an arrangement and an organization of the digital representations within the digital swatch sheet.

In an embodiment, a system for rendering a digital watermark, can include at least one processor and a memory, the memory storing instructions to cause the at least one processor to perform: in a first viewing mode, viewing a digital swatch sheet on a screen and verifying that a predefined text is darker than a background, wherein the digital swatch sheet is initially configured with multiple gray values; in a second viewing mode, viewing the digital swatch sheet on the screen and verifying that a second predefined text is lighter than the background; at a second angle, verifying that the inverse of the first and second viewing modes is true; and at a third angle, verifying that the digital watermark virtually disappears with respect to at least two gray swatches on the digital swatch sheet, wherein the at least two gray swatches are based on the multiple gray values.

In an embodiment of the system, the instructions can further cause the at least one processor to perform: adding at least one working patch to a digital document based on the verified digital watermark.

In an embodiment of the system, the verified digital watermark can comprise a monochromatic watermark.

In an embodiment, the instructions can further cause the at least one processor to perform adding at least one working patch to a digital document based on the verified digital watermark, wherein the verified digital watermark comprises a monochromatic watermark.

In an embodiment, in the first viewing mode, viewing the digital swatch sheet on the screen and verifying that the predefined text is darker than the background, can further involve: verifying that the verifying that the predefined text is darker than the background in one part of the digital watermark.

In an embodiment, in the second viewing mode, viewing the digital swatch sheet on the screen and verifying that the second predefined text is lighter than the background, can further involve: verifying that the second predefined text is lighter than the background in another part of the digital watermark.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A method for rendering a watermark, comprising:

creating a digital watermark by applying grayscale inversion and contrast reduction to a document, resulting in a visually distinguishable pattern, wherein creating the digital watermark includes creating a digital swatch sheet of multiple gray values; and rendering a digital watermark on the document in a manner that allows verification at different viewing angles.

2. The method of claim 1 wherein the digital watermark comprises a monochromatic watermark.

3. The method of claim 1 further comprising:

viewing the document at varying angles to verify a validity of the document based on the visibility and characteristics of the digital watermark.

4. The method of claim 1 further comprising:

modifying the digital watermark based on predetermined parameters to facilitate enhanced security against fraud.

5. The method of claim 1 further comprising:

viewing the document at varying angles to verify a validity of the document based on the visibility and characteristics of the digital watermark; and modifying the digital watermark based on predetermined parameters to facilitate enhanced security against fraud.

6. The method of claim 1 wherein rendering the digital watermark on the document in a manner that allows verification at different viewing angles, further comprises:

rendering the digital watermark in a monochrome application.

7. A method for rendering a digital watermark, comprising:

in a first viewing mode, viewing a digital swatch sheet on a screen and verifying that a predefined text is darker than a background, wherein the digital swatch sheet is initially configured with multiple gray values;

in a second viewing mode, viewing the digital swatch sheet on the screen and verifying that a second predefined text is lighter than the background;

at a second angle, verifying that the inverse of the first and second viewing modes is true;

at a third angle, verifying that the digital watermark virtually disappears with respect to at least two gray swatches on the digital swatch sheet, wherein the at least two gray swatches are based on the multiple gray values.

8. The method of claim 7 further comprising adding at least one working patch to a digital document based on the verified digital watermark.

9. The method of claim 7 wherein the verified digital watermark comprises a monochromatic watermark.

10. The method of claim 7 further comprising adding at least one working patch to a digital document based on the verified digital watermark, wherein the verified digital watermark comprises a monochromatic watermark.

11. The method of claim 7 wherein in the first viewing mode, viewing the digital swatch sheet on the screen and verifying that the predefined text is darker than the background, further comprises:

verifying that the verifying that the predefined text is darker than the background in one part of the digital watermark.

12. The method of claim 11 wherein in the second viewing mode, viewing the digital swatch sheet on the screen and verifying that the second predefined text is lighter than the background, further comprises:

verifying that the second predefined text is lighter than the background in another part of the digital watermark.

13. The method of claim 7 further comprising generating the digital swatch sheet with multiple gray values by arranging in a predefined layout digital representations of a plurality of gray values among the multiple gray values.

14. The method of claim 13 further comprising providing a user interface for customizing an arrangement and an organization of the digital representations within the digital swatch sheet.

15. A system for rendering a digital watermark, comprising:

at least one processor and a memory, the memory storing instructions to cause the at least one processor to perform:

in a first viewing mode, viewing a digital swatch sheet on a screen and verifying that a predefined text is darker than a background, wherein the digital swatch sheet is initially configured with multiple gray values;

in a second viewing mode, viewing the digital swatch sheet on the screen and verifying that a second predefined text is lighter than the background;

at a second angle, verifying that the inverse of the first and second viewing modes is true; and at a third angle, verifying that the digital watermark virtually disappears with respect to at least two gray swatches on the digital swatch sheet, wherein the at least two gray swatches are based on the multiple gray values.

16. The system of claim 15 wherein the instructions further cause the at least one processor to perform: adding at least one working patch to a digital document based on the verified digital watermark.

17. The system of claim 15 wherein the verified digital watermark comprises a monochromatic watermark.

18. The system of claim 15 wherein the instructions further cause the at least one processor to perform adding at least one working patch to a digital document based on the verified digital watermark, wherein the verified digital watermark comprises a monochromatic watermark.

19. The method of claim 15 wherein in the first viewing mode, viewing the digital swatch sheet on the screen and verifying that the predefined text is darker than the background, further comprises:

verifying that the verifying that the predefined text is darker than the background in one part of the digital watermark.

20. The method of claim 19 wherein in the second viewing mode, viewing the digital swatch sheet on the screen and verifying that the second predefined text is lighter than the background, further comprises:

verifying that the second predefined text is lighter than the background in another part of the digital watermark.

* * * * *